United States Patent [19]
Tatsuno

[11] Patent Number: 5,276,553
[45] Date of Patent: Jan. 4, 1994

[54] ULTRA WIDE ANGLE ZOOM LENS
[75] Inventor: Wataru Tatsuno, Yokohama, Japan
[73] Assignee: Nikon Corporation, Tokyo, Japan
[21] Appl. No.: 989,585
[22] Filed: Dec. 11, 1992
[30] Foreign Application Priority Data
  Dec. 25, 1991 [JP] Japan .................................. 3-342608
[51] Int. Cl.$^5$ ............................................. G02B 15/14
[52] U.S. Cl. .................................... 359/686; 359/683; 359/715
[58] Field of Search ............... 359/680, 682, 708, 715, 359/753, 773, 676, 683, 686, 781, 771

[56] References Cited
U.S. PATENT DOCUMENTS 4,477,153 10/1984 Suda et al. ......................... 359/680
5,000,550 3/1991 Takahashi et al. .................. 359/680

Primary Examiner—Martin Lerner
Assistant Examiner—Evelyn A. Lester
Attorney, Agent, or Firm—Shapiro and Shapiro

[57] ABSTRACT

An ultra wide angle zoom lens is composed, in the order from the object side, of a first lens group of a negative refractive power, a second lens group of a positive refractive power, a third lens group of a negative refractive power, and a fourth lens group of a positive refractive power, in which the lens groups axially move, in the zooming operation from the wide angle end to the telephoto end, in such a manner that the distance between the first and second lens groups decreases, while that between the second and third lens groups increases and that between the third and fourth lens groups decreases, and in which the lens groups satisfy additional conditions.

9 Claims, 3 Drawing Sheets

ULTRA WIDE ANGLE ZOOM LENS

BACKGROUND OF THE INVENTION

1. Field of the Invention

The present invention relates to a zoom lens adapted for use in a single lens reflex camera of so-called 35 mm Leica format, an electronic still camera, a video camera or the like, and more particularly to an ultra wide angle zoom lens of an F-number of about 2.8 with the image angle at the wide angle end of 90° or larger.

2. Related Background Art

As an ultra wide angle zoom lens with the image angle exceeding 90° at the wide angle end there are already known a 2-group zoom lens consisting of a front group of a negative refractive power and a rear group of a positive refractive power as disclosed in U.S. Pat. No. 4,477,153, and a zoom lens in which the rear group of a positive refractive power is divided into three groups of positive, negative and positive refractive powers, thus forming four groups in total, as disclosed in U.S. Pat. No. 5,000,550.

However, the former zoom lens described in U.S. Pat. No. 4,477,153 has an F-number of only about 3.5 in the examples described therein, and, if the aperture ratio is made larger, the lenses in the rear group become thicker, whereby the enough rear focal length becomes difficult to secure. On the other hand, the latter zoom lens described in U.S. Pat. No. 5,000,550 can attain a larger aperture ratio while securing a certain rear focal length, by dividing the rear lens group into three groups respectively of positive, negative and positive refractive powers and, in the zooming operation, maintaining the amount of movement of the negative lens group in the rear group less than that of other positive lens group, thereby reducing the amount of movement of the entire rear group.

However, in such zoom lens, as well as in the former one, the front lens group of negative refractive power tends to become huge in comparison with other lens groups because of the large incident angle.

SUMMARY OF THE INVENTION

The object of the present invention is to resolve the drawbacks of the above-mentioned known zoom lenses and to provide an ultra wide angle zoom lens which has a high zooming efficiency despite of a large aperture ratio, which also has a sufficient rear focal length, and which is compact in shape.

The above-mentioned object can be attained, according to the present invention, by an ultra wide angle zoom lens comprising, in the order from the object side, a first lens group of a negative refractive power consisting of a negative meniscus lens convex to the object side, a negative lens, and at least a positive lens; a second lens group of a positive refractive power consisting of an adhered positive lens and a positive lens; a third lens group of a negative refractive power including an adhered negative lens; and a fourth lens group of a positive refractive power including an adhered lens, wherein said lens groups axially move in the zooming operation from the wide angle end to the telephoto end, in such a manner that the distance between the first and second lens group decreases, while the distance between the second and third lens groups increase, and the distance between the third and fourth lens groups decreases, and said lens groups satisfy following conditions:

$$1 < |F_1/F_w| < 2; F_1 < 0 \quad (1)$$

$$2 < |F_{2F}/F_w| < 5 \quad (2)$$

$$2.5 < |F_{2R}/F_w| < 5.5 \quad (3)$$

$$1.5 < |F_3/F_w| < 3; F_3 < 0 \quad (4)$$

$$1.7 < |F_4/F_w| < 2.5 \quad (5)$$

$$0.17 < D_1/F_w < 1.2 \quad (6)$$

$$0.5 < |F_{1F}/F_w| < 1.5; F_{1F} < 0 \quad (7)$$

wherein:
- $F_w$: focal length of the entire lens system at the wide angle end;
- $F_1$: focal length of the first lens group;
- $F_{1F}$: synthesized focal length of first and second lenses in the order from the object side in the first lens group;
- $F_{2F}$: focal length of the adhered lens group at the object side in the second lens group;
- $F_{2R}$: focal length of the single lens at the image side of the second lens group;
- $F_3$: focal length of the fourth lens group; and
- $D_1$: axial distance from the negative lens at the image side to the positive lens closest to the image side in the first lens group.

Also the meniscus lens closest to the object side preferably has an aspherical face at the object side or the image side thereof.

The above-explained configuration of the present invention can provide an ultra wide angle zoom lens which has a high zooming efficiency even at an aperture ratio as large as about F2.8 and also has a sufficient rear focal length, an ultra wide image angle exceeding 90° at the wide angle end and a relatively compact shape.

Other objects of the present invention, and the features and advantages thereof, will become fully apparent from the following detailed description which is to be taken in conjunction with the attached drawings.

DETAILED DESCRIPTION OF THE PREFERRED EMBODIMENTS

Now the present invention will be clarified in detail by preferred embodiments thereof shown in the attached drawings.

Figure 1:
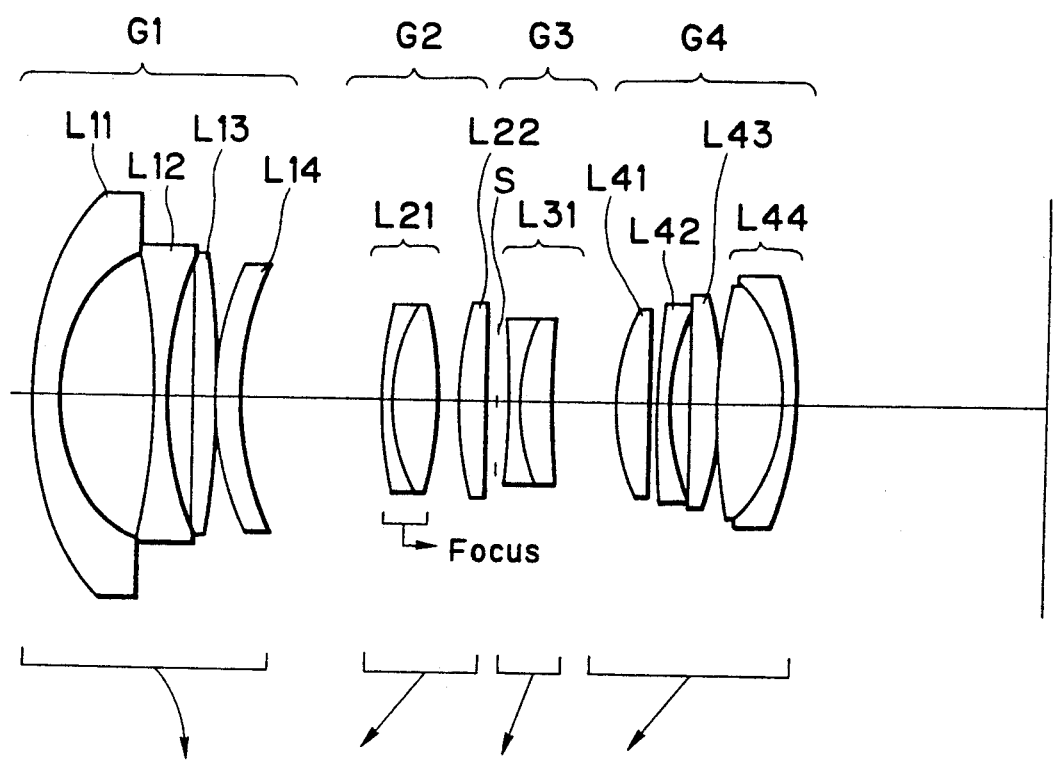
FIG. 1 is a view of a first embodiment of the present invention, showing the structure and arrangement of lenses in a state focused to the infinite distance at the wide angle end.
Figure 2:
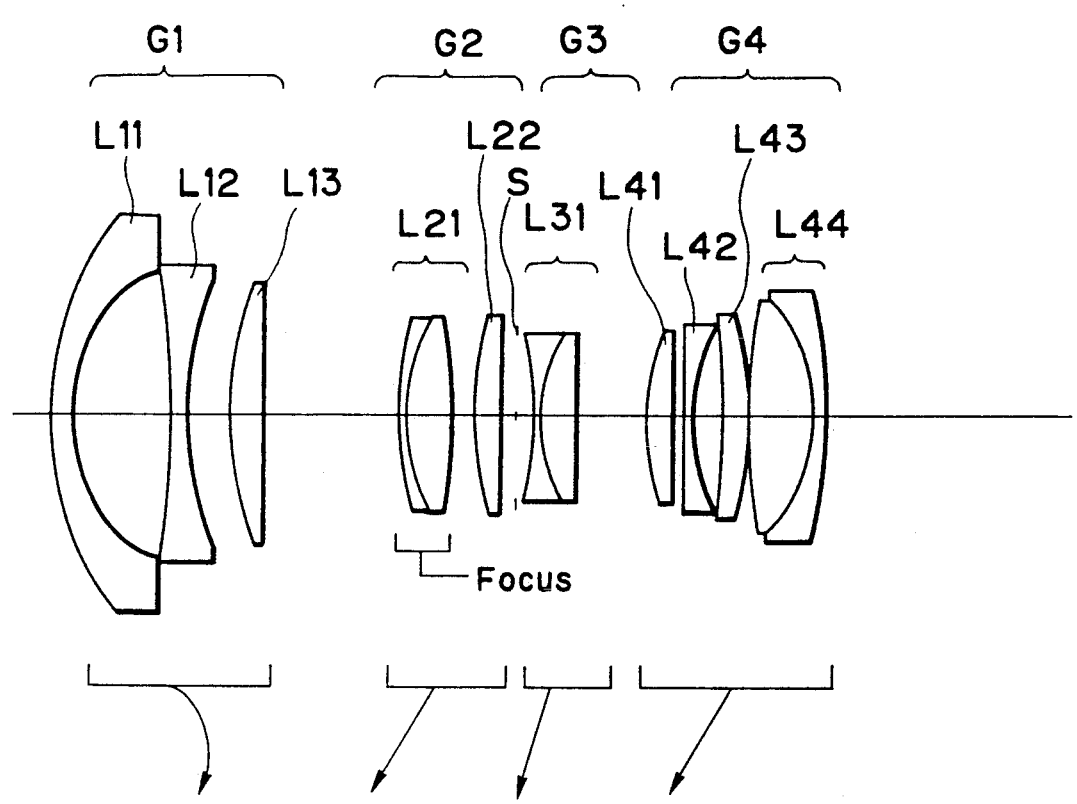
FIG. 2 is a view of a second embodiment of the present invention, showing the structure and arrangement of lenses in a state focused to the infinite distance at the wide angle end.
Figure 3:
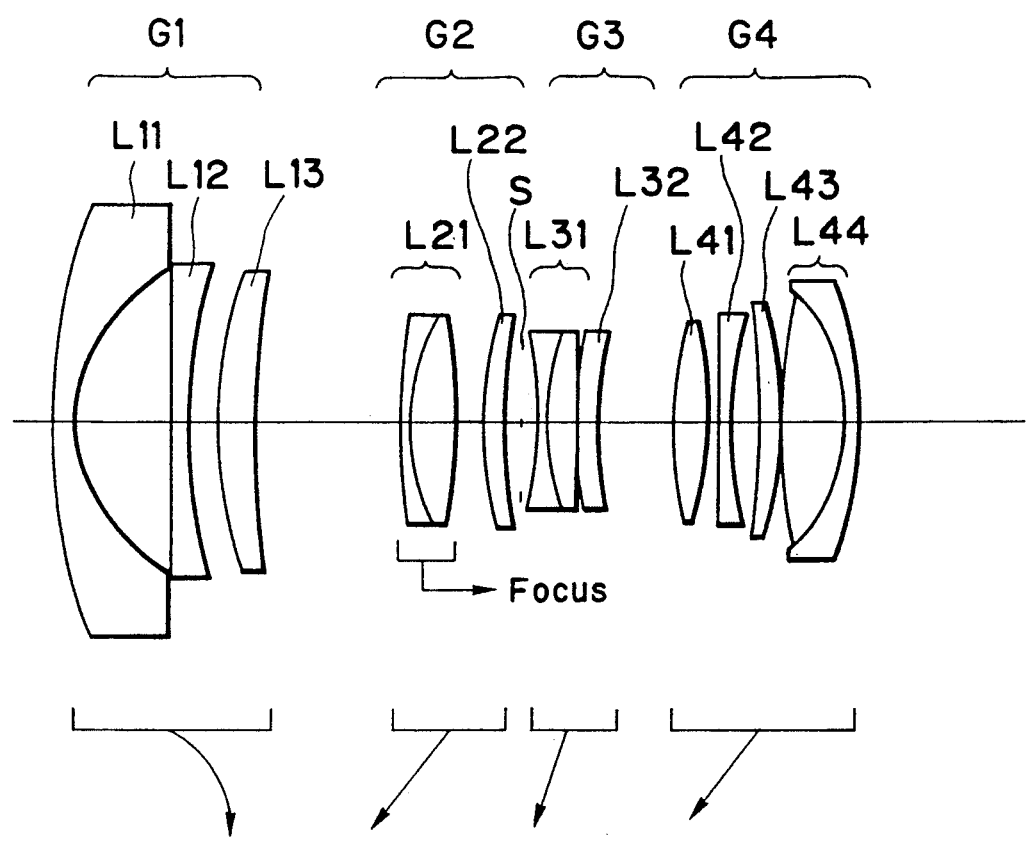
FIG. 3 is a view of a third embodiment of the present invention, showing the structure and arrangement of lenses in a state focused to the infinite distance at the wide angle end.

Each of the embodiments of the present invention includes, as shown in FIGS. 1 to 3, in the order from the object side, a first lens group $G_1$ of a negative refractive power composed of a negative meniscus lens $L_{11}$ convex to the object side, a negative single lens $L_{12}$ and at least a positive lens $L_{12}$; a second lens group $G_2$ of a positive refractive power composed of an adhered positive lens $L_{21}$ consisting of a negative lens and a positive lens, and a positive single lens $L_{22}$; a third lens group $G_3$ of a negative refractive power composed at least of an adhered negative lens $L_{31}$ consisting of a negative lens and a positive lens; and a fourth lens group $G_4$ of a positive refractive power composed at least of an adhered positive lens $L_{44}$ consisting of a positive lens and a negative lens, and a diaphragm S is provided between the second lens group $G_2$ and the third lens group $G_3$.

Said lens groups are so constructed as to axially move, in the zooming operation from the wide angle end to the telephoto end, in such a manner that the distance between the first lens group $G_1$ and the second lens group $G_2$ decreases, that between the second lens group $G_2$ and the third lens group $G_3$ increases and that between the third lens group $G_3$ and the fourth lens group $G_4$ decreases, and as to satisfy following conditions, in which $F_W$ stands for the focal length of the entire lens system at the wide angle end:

$$1 < |F_1/F_W| < 2; F_1 < 0 \quad (1)$$

$$2 < F_{2F}/F_W < 5 \quad (2)$$

$$2.5 < F_{2R}/F_W < 5.5 \quad (3)$$

$$1.5 < |F_3/F_W| < 3; F_3 < 0 \quad (4)$$

$$1.7 < F_4/F_W < 2.5 \quad (5)$$

$$0.17 < D_1/F_W < 1.2 \quad (6)$$

$$0.5 < |F_{1F}/F_W| < 1.5; F_{1F} < 0 \quad (7)$$

wherein:

$F_1$: focal length of the first lens group $G_1$;

$F_{2F}$: focal length of the adhered positive lens $L_{21}$ in the second lens group $G_2$;

$F_{2R}$: focal length of the positive single lens $L_{22}$ in the second lens group $G_2$;

$F_3$: focal length of the fourth lens group $G_3$;

$F_4$: focal length of the fourth lens group $G_4$;

$D_1$: axial distance from the negative single lens $L_{12}$ to the positive lens closest to the image side in the first lens group $G_1$; and $F_{1F}$: synthesized focal length of the negative meniscus lens $L_{11}$ and the negative single lens $L_{12}$ in the first lens group $G_1$.

As explained above, the lens of the present invention is composed of four lens groups respectively of negative, positive, negative and positive refractive powers, which axially move, in the zooming operation from the wide angle end to the telephoto end, in such a manner that the distance between the first and second lens groups $G_1$, $G_2$ decreases, while that between the second and third lens groups $G_2$, $G_3$ increases and that between the third and fourth lens groups $G_3$, $G_4$ decreases. Such moving system increases the zooming efficiency in the zooming operation, and also increases the freedom of refractive power distribution in the lens groups, wherein the deficiency in the rear focal length resulting from the increase in the aperture ratio can be compensated by an increase in the refractive power of the first lens group $G_1$.

In addition, satisfactory corrections for the aberrations can be attained by the conditions (1) to (7), of which meaning will be explained in the following.

The condition (1) relates to the refractive power of the first lens group $G_1$. Above the upper limit of the condition (1), the refractive power of the first lens group $G_1$ becomes weaker, thus requiring a larger filter diameter. Also at the zooming operation, the amount of movement of the first lens group $G_1$ becomes larger, so that the entire length will become undesirably huge. On the other hand, below the lower limit, the refractive power of the first lens group $G_1$ becomes stronger, favorably for compactization. At the same time, however, there will be encountered an increased distortion aberration etc. and the structure of the first lens group $G_1$ has to be made more complex for correcting such aberrations. For this reason the lenses of the first lens group $G_1$ will undesirably become thicker, and the filter diameter will also have to be increased.

The condition (2) relates to the refractive force of the adhered lens $L_{21}$ at the object side in the second lens group $G_2$.

Above the upper limit of said condition (2), the refractive force of the adhered lens $L_{21}$ at the object side in the second lens group $G_2$ becomes weaker, and such state is favorable for the correction of the spherical aberration but is undesirable for the correction of other aberrations. On the other hand, below the lower limit, the refractive power of said adhered lens $L_{21}$ becomes excessively strong, and such state is undesirable for the correction of the spherical aberration.

The condition (3) relates to the refractive force of the positive lens $L_{22}$ at the image side in the second lens group $G_2$.

Above the upper limit of the condition (3), the refractive force of the positive lens $L_{22}$ at the image side in the second lens group $G_2$ becomes weaker, and such state is favorable for securing the rear focal length but is undesirable for the compactization of the lens as the entire length becomes large and the diameter of the diaphragm becomes also large. On the other hand, below the lower limit, the refractive power of said positive lens $L_{22}$ becomes stronger, and such state is favorable for compactization but is undesirable for securing the sufficient rear focal length.

The condition (4) relates to the refractive power of the third lens group $G_3$. Above the upper limit, the refractive power of the third lens group $G_3$ becomes weaker, and such state is favorable for the correction of aberration, but the undesirable for securing the sufficient rear focal length. On the other hand, below the lower limit, the refractive power of the third lens group $G_3$ becomes stronger, and such state is favorable for securing the rear focal length, but unfavorable for the correction of the aberrations. Particularly the spherical aberration shows a large variation in the zooming operation, and is difficult to correct.

The condition (5) relates to the refractive power of the fourth lens group $G_4$.

Above the upper limit of the condition (5), the refractive power of the fourth lens group $G_4$ becomes weaker, favorably for the correction of the aberrations. It is however difficult to obtain the sufficient rear focal length while maintaining the focal length of the entire lens system at the wide angle end. On the other hand, below the lower limit, the refractive power of the fourth lens group $G_4$ becomes stronger, and such state is favorable for obtaining the large rear focal length, but undesirable because the correction of aberrations becomes difficult.

The condition (6) relates to the axial distance from the negative lens $L_{12}$ to the positive lens $L_{14}$ closest to the image side in the first lens group $G_1$. The positive lens $L_{14}$ closest to the image side in the first lens group $G_1$ is effective for correcting the aberrations dependent on the image angle, such as astigmatism, as it can control the oblique rays without significant effect on the axial ray.

Thus, above the upper limit of the condition (6), there will result a tendency to bend the oblique rays toward the axial direction. Such situation is favorable for reducing the effective diameter of the first lens group $G_1$ and for correction of aberrations, but, because the axial length of the first lens group $G_1$ becomes large, it becomes necessary to increase the distance between the first and second lens groups $G_1$, $G_2$ in order to avoid interference between these lens groups in the zooming operation, whereby the entire length of the lens system becomes undesirably huge. Also a range below the lower limit is favorable for reducing the length of the first lens group $G_1$, but is undesirable because the structure of the first lens group $G_1$ has to be made complex in order to correct the image angle-dependent aberrations.

The condition (7) defines the synthesized focal length of the negative meniscus lens $L_{11}$ and the negative lens $L_{12}$ in the first lens group $G_1$.

Above the upper limit of the condition (7), the rear focal length cannot be secured, and, if the rear focal length is secured, the first lens group $G_1$ has to be made complex in the structure. On the other hand, a range below the lower limit is favorable for securing the rear focal length and for compactization, but is undesirable because the correction of aberrations is difficult, and because the structure of the first lens group $G_1$ has to be made complex in order to correct said aberrations.

In addition to the foregoing structures, the use of an aspherical face in either side of the negative meniscus lens in the first lens group $G_1$ allows to satisfactorily correct the distortion and the astigmatism, and to compactize the first lens group $G_1$.

In the following, the structure of the zoom lens of the present invention will be explained further by embodiments thereof.

FIG. 1 shows the lens configuration of a first embodiment of the present invention. The zoom lens of the present embodiment comprises, in the order from the object side, a first lens group $G_1$ composed of a negative meniscus lens $L_{11}$ convex to the object side, a negative biconcave lens $L_{12}$, a positive biconvex lens $L_{13}$ and a positive meniscus lens $L_{14}$ convex to the image side; a second lens group $G_2$ composed of a positive adhered biconvex lens $L_{21}$ consisting of a negative meniscus lens convex to the object side and a positive biconvex lens, and a positive meniscus lens $L_{22}$ convex to the object side; a diaphragm S; a third lens group $G_3$ composed solely of a negative adhered biconcave lens $L_{31}$ consisting of a negative biconcave lens and a positive meniscus lens convex to the object side; and a fourth lens group $G_4$ composed of a positive meniscus lens $L_{41}$ convex to the object side, a negative meniscus lens $L_{42}$ convex to the object side, a positive meniscus lens $L_{43}$ convex to the image side, and a positive adhered biconvex lens $L_{44}$ consisting of a biconvex lens and a negative meniscus lens convex to the image side.

The focusing is executed by the axial movement of the positive adhered lens $L_{21}$ in the second lens group $G_2$ so as to vary the axial distance to the positive meniscus lens $L_{22}$.

FIG. 2 shows the lens configuration of a second embodiment of the present invention. The zoom lens of this embodiment comprises, in the order from the object side, a first lens group $G_1$ composed of a negative meniscus lens $L_{11}$ convex to the object side, a negative biconcave lens $L_{12}$ and a positive meniscus lens $L_{13}$ convex to the object side; a second lens group $G_2$ composed of a positive adhered biconvex lens $L_{21}$ consisting of a negative meniscus lens convex to the object side and a positive biconvex lens, and a positive meniscus lens $L_{22}$ convex to the object side; a diaphragm S; a third lens group $G_3$ solely composed of a negative adhered biconcave lens consisting of a negative biconcave lens and a positive meniscus lens convex to the object side; and a fourth lens group $G_4$ composed of a positive meniscus lens $L_{41}$ convex to the object side, a negative meniscus lens $L_{42}$ convex to the object side, a positive meniscus lens $L_{43}$ convex to the image side, and a positive adhered biconvex lens $L_{44}$ consisting of a biconvex lens and a negative meniscus lens convex to the image side.

The focusing is achieved by the axial movement of the adhered positive lens $L_{21}$ in the second lens group $G_2$ so as to vary the axial distance to the positive meniscus lens $L_{22}$.

FIG. 3 shows the lens configuration of a third embodiment of the present invention. The zoom lens of this embodiment comprises, in the order from the object side, a first lens group $G_1$ composed of a negative meniscus lens $L_{11}$ convex to the object side, a negative biconcave lens $L_{12}$, and a positive meniscus lens $L_{13}$ convex to the object side; a second lens group $G_2$ composed of a positive adhered biconvex lens $L_{21}$ consisting of a negative meniscus lens convex to the object side and a positive biconvex lens, and a positive meniscus lens $L_{22}$ convex to the object side; a diaphragm S; a third lens group $G_3$ composed of a negative adhered biconcave lens $L_{31}$ consisting of a negative biconcave lens and a positive meniscus lens convex to the object side, and a negative meniscus lens $L_{32}$ convex to the object side; and a fourth lens group $G_4$ composed of a positive biconvex lens $L_{41}$, a negative biconcave lens $L_{42}$, a positive meniscus lens $L_{43}$ convex to the image side, and a positive adhered biconvex lens $L_{44}$ consisting of a positive biconvex lens and a negative meniscus lens convex to the image side.

The focusing is achieved by the axial movement of the positive adhered lens $L_{21}$ in the second lens group $G_2$ so as to vary the axial distance to the positive meniscus lens $L_{22}$.

Following Tables 1 to 3 show the parameters of the embodiments of the present invention, wherein the numbers at the left-hand end indicate the order from the object side. In these Tables, r stands for the radius of curvature of lens face; d for distance between lens faces; n for refractive index and ν for Abbe's number, both for d line (λ=587.6 nm); FN for F-number; 2 ω for image angle; $d_0$ for distance from the object to the lens face closest to the object; and Bf for rear focus distance. Also the aspherical face is defined by the following equation:

$$X(h) = \frac{h^2/r}{1 + (1 - kh^2/r^2)^{\frac{1}{2}}} + \sum_{i=1}^{5} (C_{2i} \times h^{2i})$$

wherein:

h: height from the optical axis;
X(h): axial distance to the tangential plane to the aspherical face at a height h from the optical axis;
r: radius of curvature on optical axis;
k: conical constant;
$C_{2i}$: 2i-th order aspherical coefficient.

TABLE 1

(parameters of the 1st embodiment)

$f = 20.5 \sim 34.0$, $FN = 2.89$, $2\omega = 93.1° \sim 64.6°$

|  | r | d | ν | n |
|---|---|---|---|---|
| 1 | 49.529 | 2.50 | 49.4 | 1.77279 |
| 2 | 19.409 | 13.00 | | |
| 3 | −82.454 | 2.00 | 47.5 | 1.78797 |
| 4 | 38.992 | 2.80 | | |
| 5 | 153.969 | 4.00 | 31.6 | 1.75692 |
| 6 | −153.969 | 0.20 | | |
| 7 | 34.815 | 3.50 | 31.6 | 1.75692 |
| 8 | 51.692 | (d8 = variable) | | |
| 9 | 43.020 | 1.20 | 29.5 | 1.71736 |
| 10 | 22.359 | 5.50 | 69.9 | 1.51860 |
| 11 | 56.755 | (d11 = variable) | | |
| 12 | 48.361 | 3.00 | 53.9 | 1.71300 |
| 13 | 436.187 | (d13 = variable) | | |
| 14 | −63.760 | 1.20 | 52.3 | 1.74810 |
| 15 | 22.250 | 4.00 | 25.4 | 1.80518 |
| 16 | 76.693 | (d16 = variable) | | |
| 17 | 28.759 | 3.00 | 50.8 | 1.65844 |
| 18 | 68.431 | 1.50 | | |
| 19 | 67.908 | 2.00 | 26.1 | 1.78470 |
| 20 | 27.642 | 2.50 | | |
| 21 | 2058.323 | 4.00 | 45.4 | 1.79668 |
| 22 | −50.144 | 0.20 | | |
| 23 | 105.997 | 8.00 | 57.0 | 1.62280 |
| 24 | −20.350 | 1.70 | 23.0 | 1.86074 |
| 25 | −44.631 | (BF = variable) | | |

(Variable distances for zooming)

| f | 20.5000 | 28.0000 | 34.0000 |
|---|---|---|---|
| $d_0$ | ∞ | ∞ | ∞ |
| d8 | 17.8289 | 6.3818 | 1.5051 |
| d11 | 3.3045 | 3.3045 | 3.3045 |
| d13 | 3.5982 | 8.1846 | 11.7305 |
| d16 | 9.1470 | 4.5606 | 1.0148 |
| Bf | 38.5995 | 45.1515 | 50.2170 |

(Aspherical constants of 1st face)

| Conical constant: | $k = 0.1000 \times 10$ |
|---|---|
| Aspherical constants: | $C_2 = 0.0000$ |
| | $C_4 = 0.4780 \times 10^{-5}$ |
| | $C_6 = 0.4468 \times 10^{-8}$ |
| | $C_8 = -0.7609 \times 10^{-11}$ |
| | $C_{10} = 0.1215 \times 10^{-13}$ |

In the parameters shown in Table 1, the values corresponding to the foregoing conditions are as follows:

$F_1/F_w = -1.365$ (1)

$F_{2F}/F_w = 2.928$ (2)

$F_{2R}/F_w = 3.709$ (3)

$F_3/F_w = -2.445$ (4)

$F_4/F_w = 1.951$ (5)

$D_1/F_w = 0.341$ (6)

$F_{1F}/F_w = 0.781$ (7)

TABLE 2

(parameters of the 2nd embodiment)

$f = 20.5 \sim 34.0$, $FN = 2.89$, $2\omega = 93.1° \sim 64.6°$

|  | r | d | ν | n |
|---|---|---|---|---|
| 1 | 44.314 | 2.50 | 49.4 | 1.77279 |
| 2 | 19.154 | 12.00 | | |
| 3 | −129.593 | 2.00 | 47.5 | 1.78797 |
| 4 | 38.070 | 6.00 | | |
| 5 | 48.935 | 3.50 | 31.6 | 1.75692 |
| 6 | 263.174 | (d6 = variable) | | |
| 7 | 48.905 | 1.20 | 29.5 | 1.71736 |
| 8 | 26.438 | 5.50 | 69.9 | 1.51860 |
| 9 | −57.804 | (d9 = variable) | | |
| 10 | 44.322 | 3.00 | 49.5 | 1.74443 |
| 11 | 288.035 | (d11 = variable) | | |
| 12 | −64.082 | 2.00 | 47.5 | 1.78797 |
| 13 | 20.843 | 1.20 | 25.8 | 1.78472 |
| 14 | 102.530 | (d14 = variable) | | |
| 15 | 24.674 | 3.00 | 48.1 | 1.71700 |
| 16 | 102.662 | 1.00 | | |
| 17 | 172.001 | 2.00 | 28.6 | 1.79504 |
| 18 | 24.356 | 3.00 | | |
| 19 | −325.772 | 3.50 | 45.0 | 1.74400 |
| 20 | −42.702 | 0.20 | | |
| 21 | 80.208 | 8.00 | 50.8 | 1.65844 |
| 22 | −19.385 | 1.70 | 23.0 | 1.86074 |
| 23 | −47.235 | (BF = variable) | | |

(Variable distances for zooming)

| f | 20.4970 | 27.9999 | 33.9999 |
|---|---|---|---|
| $d_0$ | ∞ | ∞ | ∞ |
| d6 | 17.3048 | 5.8691 | 0.9809 |
| d9 | 3.0183 | 3.0183 | 3.0183 |
| d11 | 4.0061 | 8.5111 | 11.9935 |
| d14 | 9.0001 | 4.4951 | 1.0127 |
| Bf | 38.5766 | 45.0123 | 49.9870 |

(Aspherical constants of 1st face)

| Conical constant: | $k = 0.1000 \times 10$ |
|---|---|
| Aspherical constants: | $C_2 = 0.0000$ |
| | $C_4 = 0.4166 \times 10^{-5}$ |
| | $C_6 = 0.4635 \times 10^{-8}$ |
| | $C_8 = -0.6433 \times 10^{-11}$ |
| | $C_{10} = 0.1160 \times 10^{-13}$ |

In the parameters of Table 2, the values corresponding to the foregoing conditions are as follows:

$F_1/F_w = -1.366$ (1)

$F_{2F}/F_w = 3.073$ (2)

$F_{2R}/F_w = 3.415$ (3)

$F_3/F_w = -2.393$ (4)

$F_r/F_w = 1.951$ (5)

$D_1/F_w = 0.293$ (6)

$F_{1F}/F_w = 0.875$ (7)

TABLE 3

(parameters of the 3rd embodiment)

$f = 20.6 \sim 34.0$, $FN = 2.89$, $2\omega = 92.8° \sim 64.6°$

|  | r | d | ν | n |
|---|---|---|---|---|
| 1 | 66.108 | 2.50 | 49.4 | 1.77279 |
| 2 | 19.873 | 12.00 | | |
| 3 | −1416.270 | 2.20 | 43.3 | 1.84042 |
| 4 | 69.782 | 3.50 | | |
| 5 | 48.748 | 5.00 | 25.4 | 1.80518 |
| 6 | 183.473 | (d6 = variable) | | |
| 7 | 52.816 | 1.20 | 25.4 | 1.80518 |
| 8 | 24.589 | 5.50 | 57.0 | 1.62280 |
| 9 | −68.445 | (d9 = variable) | | |
| 10 | 34.746 | 3.00 | 53.9 | 1.71300 |
| 11 | 83.441 | (d11 = variable) | | |
| 12 | −66.127 | 1.20 | 49.4 | 1.77279 |
| 13 | 30.846 | 4.00 | 25.4 | 1.80518 |
| 14 | −507.582 | 0.20 | | |

TABLE 3-continued (parameters of the 3rd embodiment)

| | | | | |
|---|---|---|---|---|
| 15 | 99.379 | 2.00 | 49.4 | 1.77279 |
| 16 | 42.197 | (d16 = variable) | | |
| 17 | 47.717 | 3.50 | 47.1 | 1.67003 |
| 18 | −64.166 | 0.50 | | |
| 19 | −372.898 | 2.00 | 33.9 | 1.80384 |
| 20 | 37.651 | 3.00 | | |
| 21 | −257.673 | 3.00 | 53.7 | 1.69350 |
| 22 | −54.059 | 0.20 | | |
| 23 | 63.044 | 7.50 | 58.5 | 1.61272 |
| 24 | −20.431 | 1.70 | 23.0 | 1.86074 |
| 25 | −48.705 | (BF = variable) | | |

(Variable distances for zooming)

| | | | |
|---|---|---|---|
| f | 20.5998 | 27.9997 | 33.9996 |
| $D_0$ | ∞ | ∞ | ∞ |
| d6 | 16.9829 | 5.7705 | 0.9513 |
| d9 | 3.0032 | 3.0032 | 3.0032 |
| d11 | 3.7664 | 8.7597 | 12.6401 |
| d16 | 9.8752 | 4.8819 | 1.0015 |
| Bf | 39.0047 | 45.2461 | 50.0964 |

(Aspherical constants of 2nd face)

Conical constant: $k = 0.7000$
Aspherical constants:
$C_2 = 0.6879 \times 10^{-2}$
$C_4 = 0.4017 \times 10^{-5}$
$C_6 = 0.1607 \times 10^{-8}$
$C_8 = 0.1675 \times 10^{-10}$
$C_{10} = 0.0000$ In the parameters of Table 3, the values corresponding to the foregoing conditions are as follows:

$$F_1/F_w = -1.359 \quad (1)$$

$$F_{2F}/F_w = 2.913 \quad (2)$$

$$F_{2R}/F_w = 3.952 \quad (3)$$

$$F_3/F_w = -2.439 \quad (4)$$

$$F_4/F_w = 1.942 \quad (5)$$

$$D_1/F_w = 0.171 \quad (6)$$

$$F_{1F}/F_w = 0.771 \quad (7)$$

Any of the foregoing embodiments has a large aperture ratio of F-number of 2.8, and provides practically sufficient imaging performance, despite of a compact shape.

Also in the foregoing embodiments, the second lens group $G_2$ is divided into two groups, and the focusing is achieved by the axial movement of a group at the object side, that is, the adhered lens alone of the second lens group $G_2$. Since the lens moved for focusing is small and light in weight, such configuration is advantageous for high-speed auto focusing.

As explained in the foregoing, the present invention provides a wide angle zoom lens, which has a high zooming efficiency and a sufficiently large rear focal length while having a large aperture in the order of F2.8, and which provides an ultra wide image angle exceeding 90° at the wide angle end despite of a compact shape.

The conventional lenses of this type have been disadvantageous for achieving high-speed automatic focusing, because the focusing has been conducted by the movement of the entire front lens group or a part thereof. On the other hand, the present invention is advantageous for automatic focusing, since the focusing can be achieved by the movement of a lighter lens, instead of the large front lens group with a negative refractive power.

What is claimed is:

1. An ultra wide angle zoom lens comprising, in the order from the object side;

a first lens group of a negative refractive power composed of a negative meniscus lens convex to the object side, a negative single lens, and at least a positive lens;

a second lens group of a positive refractive power composed of a positive adhered lens consisting of a negative lens and a positive lens, and a positive single lens;

a third lens group of a negative refractive power including at least a negative adhered lens consisting of a negative lens and a positive lens; and a fourth lens group of a positive refractive power including at least a positive adhered lens consisting of a positive lens and a negative lens;

wherein, in the zooming from the wide angle end to the telephoto end, said lens groups move axially in such a manner that the distance between said first and second lens groups decreases, while that between said second and third lens groups increases, and that between said third and fourth lens groups decreases, and said lens groups are so constructed as to satisfy the following conditions, for a focal length $F_w$ of the entire lens system at the wide angle end:

$$1 < |F_1/F_W| < 2; F_1 < 0 \quad (1)$$

$$2 < F_{2F}/F_W < 5 \quad (2)$$

$$2.5 < F_{2R}/F_W < 5.5 \quad (3)$$

$$1.5 < |F_3/F_W| < 3; F_3 < 0 \quad (4)$$

$$1.7 < F_4/F_W < 2.5 \quad (5)$$

$$0.17 < D_1/F_W < 1.2 \quad (6)$$

$$0.5 < |F_{1F}/F_W| < 1.5; F_{1F} < 0 \quad (7)$$

wherein:
$F_1$: focal length of the first lens group;
$F_{2F}$: focal length of the adhered lens in the second lens group;
$F_{2R}$: focal length of the single lens in the second lens group;
$F_3$: focal length of the third lens group;
$F_4$: focal length of the fourth lens group;
$D_1$: axial distance from the negative single lens in the first lens group to the positive lens closest to the image side; and
$F_{1F}$: synthesized focal length of the negative meniscus lens and the negative single lens in the first lens group.

2. An ultra wide angle zoom lens according to claim 1, wherein said positive adhered lens in the second lens group is adapted, in the zooming, to axially move integrally with said positive single lens, and in the focusing, to singly move so as to vary the axial distance to said positive single lens.

3. An ultra wide angle zoom lens according to claim 1, wherein said negative meniscus lens in said first lens group has an aspherical face in at least either of the faces at the object side and at the image side.

4. An ultra wide angle zoom lens according to claim 1, wherein, said first lens group consists of a negative meniscus lens convex to the object side, a negative biconcave lens, a positive biconvex lens, and a positive meniscus lens convex to the object side;

said second lens group consists of a positive adhered lens consisting of a negative meniscus lens convex to the object side and a positive biconvex lens, and a positive meniscus lens convex to the object side;

said third lens group consists of a negative adhered biconcave lens consisting of a negative biconcave lens and a positive meniscus lens convex to the object side; and said fourth lens group consists of a positive meniscus lens convex to the object side, a negative meniscus lens convex to the object side, a positive meniscus lens convex to the image side, and a positive adhered biconvex lens consisting of a biconvex lens and a negative meniscus lens convex to the image side.

5. An ultra wide angle zoom lens according to claim 1, wherein said first lens group consists of a negative meniscus lens convex to the object side, a negative biconcave lens, and a positive meniscus lens convex to the object side;

said second lens group consists of a positive adhered lens consisting of a negative meniscus lens convex to the object side and a positive biconvex lens, and a positive meniscus lens convex to the object side;

said third lens group consists of a negative adhered biconcave lens consisting of a negative biconcave lens and a positive meniscus lens convex to the object side; and said fourth lens group consists of a positive meniscus lens convex to the object side, a negative meniscus lens convex to the object side, a positive meniscus lens convex to the image side, and a positive adhered lens consisting of a biconvex lens and a negative meniscus lens convex to the image side.

6. An ultra wide angle zoom lens according to claim 1, wherein, said first lens group consists of a negative meniscus lens convex to the object side, a negative biconcave lens, and a positive meniscus lens convex to the object side;

said second lens group consists of a positive adhered biconvex lens consisting of a negative meniscus lens convex to the object side and a positive biconvex lens, and a positive meniscus lens convex to the object side;

said third lens group consists of a negative adhered biconcave lens consisting of a negative biconcave lens and a positive meniscus lens convex to the object side, and a negative meniscus lens convex to the object side; and said fourth lens group consists of a positive biconvex lens, a negative biconcave lens, a positive meniscus lens convex to the image side, and a positive adhered biconvex lens consisting of a biconvex lens and a negative meniscus lens convex to the image side.

7. An ultra wide angle zoom lens according to claim 1, constructed with the following data:

$f = 20.5 \sim 34.0$, FN = 2.89, $2\omega = 93.1° \sim 64.6°$

| | r | d | v | n |
|---|---|---|---|---|
| 1 | 49.529 | 2.50 | 49.4 | 1.77279 |
| 2 | 19.409 | 13.00 | | |
| 3 | −82.454 | 2.00 | 47.5 | 1.78797 |
| 4 | 38.992 | 2.80 | | |
| 5 | 153.969 | 4.00 | 31.6 | 1.75692 |
| 6 | −153.969 | 0.20 | | |
| 7 | 34.815 | 3.50 | 31.6 | 1.75692 |
| 8 | 51.692 | (d8 = variable) | | |
| 9 | 43.020 | 1.20 | 29.5 | 1.71736 |
| 10 | 22.359 | 5.50 | 69.9 | 1.51860 |
| 11 | −56.755 | (d11 = variable) | | |
| 12 | 48.361 | 3.00 | 53.9 | 1.71300 |
| 13 | 436.187 | (d13 = variable) | | |
| 14 | −63.760 | 1.20 | 52.3 | 1.74810 |
| 15 | 22.250 | 4.00 | 25.4 | 1.80518 |
| 16 | 76.693 | (d16 = variable) | | |
| 17 | 28.759 | 3.00 | 50.8 | 1.65844 |
| 18 | 68.431 | 1.50 | | |
| 19 | 67.908 | 2.00 | 26.1 | 1.78470 |
| 20 | 27.642 | 2.50 | | |
| 21 | 2058.323 | 4.00 | 45.4 | 1.79668 |
| 22 | −50.144 | 0.20 | | |
| 23 | 105.997 | 8.00 | 57.0 | 1.62280 |
| 24 | −20.350 | 1.70 | 23.0 | 1.86074 |
| 25 | −44.631 | (BF = variable) | | |

| (Variable distances for zooming) | | | |
|---|---|---|---|
| f | 20.5000 | 28.0000 | 34.0000 |
| $d_0$ | ∞ | ∞ | ∞ |
| d8 | 17.8289 | 6.3818 | 1.5051 |
| d11 | 3.3045 | 3.3045 | 3.3045 |
| d13 | 3.5982 | 8.1846 | 11.7305 |
| d16 | 9.1470 | 4.5606 | 1.0148 |
| Bf | 38.5995 | 45.1515 | 50.2170 |

| (Aspherical coefficients of 1st face) | |
|---|---|
| Conical constant: | $k = 0.1000 \times 10$ |
| Aspherical constants: | $C_2 = 0.0000$ |
| | $C_4 = 0.4780 \times 10^{-5}$ |
| | $C_6 = 0.4468 \times 10^{-8}$ |
| | $C_8 = -0.7609 \times 10^{-11}$ |
| | $C_{10} = 0.1215 \times 10^{-13}$ |

$F_1/F_w = -1.365$ \hfill (1)

$F_{2F}/F_w = 2.928$ \hfill (2)

$F_{2R}/F_w = 3.709$ \hfill (3)

$F_3/F_w = -2.445$ \hfill (4)

$F_4/F_w = 1.951$ \hfill (5)

$D_1/F_w = 0.341$ \hfill (6)

$F_{1F}/F_w = 0.781$ \hfill (7)

wherein, the numbers at the left-hand side indicate the sequential order from the object side, r stands for the radius of curvature of lens face, d for the distance between lens faces, n for refractive index and $v$ for Abbe's number both for the d-line ($\lambda = 587.6$ nm), FN for F-number, $2\omega$ for image angle, $d_0$ for the distance from the object to the lens face closest thereto, Bf for the rear focal length; and the aspherical face is defined by:

$$X(h) = \frac{h^2/r}{1 + (1 - kh^2/r^2)^{\frac{1}{2}}} + \sum_{i=1}^{5}(C_{2i} \times h^{2i})$$

in which:

h: height from the optical axis;

X(h): axial distance to the tangential plane to the aspherical face at the height h from the optical axis;

r: radius of curvature at the optical axis;

k: conical constant;

$C_{2i}$: aspherical constant of 2i-th order; and
wherein:
- $F_1$: focal length of the first lens group;
- $F_{2F}$: focal length of the positive adhered lens in the second lens group;
- $F_{2R}$: focal length of the positive single lens in the second lens group;
- $F_3$: focal length of the third lens group;
- $F_4$: focal length of the fourth lens group;
- $D_1$: axial distance from the negative single lens to the positive lens closest to the image side in the first lens group; and
- $F_{1F}$: synthesized focal length of the negative meniscus lens and the negative single lens in the first lens group.

8. An ultra wide angle zoom lens according to claim 1, constructed with the following data:

| f = 20.5~34.0, FN = 2.89, 2ω = 93.1°~64.6° | | | | |
|---|---|---|---|---|
| | r | d | ν | n |
| 1 | 44.314 | 2.50 | 49.4 | 1.77279 |
| 2 | 19.154 | 12.00 | | |
| 3 | −129.593 | 2.00 | 47.5 | 1.78797 |
| 4 | 38.070 | 6.00 | | |
| 5 | 48.935 | 3.50 | 31.6 | 1.75692 |
| 6 | 263.174 | (d6 = variable) | | |
| 7 | 48.905 | 1.20 | 29.5 | 1.71736 |
| 8 | 26.438 | 5.50 | 69.9 | 1.51860 |
| 9 | −57.804 | (d9 = variable) | | |
| 10 | 44.322 | 3.00 | 49.5 | 1.74443 |
| 11 | 288.035 | (d11 = variable) | | |
| 12 | −64.082 | 2.00 | 47.5 | 1.78797 |
| 13 | 20.843 | 1.20 | 25.8 | 1.78472 |
| 14 | 102.530 | (d14 = variable) | | |
| 15 | 24.674 | 3.00 | 48.1 | 1.71700 |
| 16 | 102.662 | 1.00 | | |
| 17 | 172.001 | 2.00 | 28.6 | 1.79504 |
| 18 | 24.356 | 3.00 | | |
| 19 | −325.772 | 3.50 | 45.0 | 1.74400 |
| 20 | −42.702 | 0.20 | | |
| 21 | 80.208 | 8.00 | 50.8 | 1.65844 |
| 22 | −19.385 | 1.70 | 23.0 | 1.86074 |
| 23 | −47.235 | (BF = variable) | | |

(Variable distances for zooming)

| f | 20.4970 | 27.9999 | 33.9999 |
|---|---|---|---|
| $d_0$ | ∞ | ∞ | ∞ |
| d6 | 17.3048 | 5.8691 | 0.9809 |
| d9 | 3.0183 | 3.0183 | 3.0183 |
| d11 | 4.0061 | 8.5111 | 11.9935 |
| d14 | 9.0001 | 4.4951 | 1.0127 |
| Bf | 38.5766 | 45.0123 | 49.9870 |

(Aspherical coefficients of 1st face)

| Conical constant: | $k = 0.1000 \times 10$ |
|---|---|
| Aspherical constants: | $C_2 = 0.0000$ |
| | $C_4 = 0.4166 \times 10^{-5}$ |
| | $C_6 = 0.4635 \times 10^{-8}$ |
| | $C_8 = -0.6433 \times 10^{-11}$ |
| | $C_{10} = 0.1160 \times 10^{-13}$ |

$F_1/F_w = -1.366$ (1)

$F_{2F}/F_w = 3.073$ (2)

$F_{2R}/F_w = 3.415$ (3)

$F_3/F_w = -2.393$ (4)

$F_4/F_w = 1.951$ (5)

$D_1/F_w = 0.293$ (6)

$F_{1F}/F_w = 0.875$ (7)

wherein, the numbers at the left-hand side indicate the sequential order from the object side, r stands for the radius of curvature of lens face, d for the distance between lens faces, n for refractive index and ν for Abbe's number both for the d-line (λ=587.6 nm), FN for F-number, 2 ω for image angle, $d_0$ for the distance from the object to the lens face closest thereto, Bf for the rear focal length; and the aspherical face is defined by:

$$X(h) = \frac{h^2/r}{1 + (1 - kh^2/r^2)^{\frac{1}{2}}} + \sum_{i=1}^{5}(C_{2i} \times h^{2i})$$

in which:
- h: height from the optical axis;
- X(h): axial distance to the tangential plane to the aspherical face at the height h from the optical axis;
- r: radius of curvature at the optical axis;
- k: conical constant;
- $C_{2i}$: aspherical constant of 2i-th order; and wherein:
- $F_1$: focal length of the first lens group;
- $F_{2F}$: focal length of the positive adhered lens in the second lens group;
- $F_{2R}$: focal length of the positive single lens in the second lens group;
- $F_3$: focal length of the third lens group;
- $F_4$: focal length of the fourth lens group;
- $D_1$: axial distance from the negative single lens to the positive lens closest to the image side in the first lens group; and
- $F_{1F}$: synthesized focal length of the negative meniscus lens and the negative single lens in the first lens group.

9. An ultra wide angle zoom lens according to claim 1, constructed with the following data:

| f = 20.6~34.0, FN = 2.89, 2ω = 92.8°~64.6° | | | | |
|---|---|---|---|---|
| | r | d | ν | n |
| 1 | 66.108 | 2.50 | 49.4 | 1.77279 |
| 2 | 19.873 | 12.00 | | |
| 3 | −1416.270 | 2.20 | 43.3 | 1.84042 |
| 4 | 69.782 | 3.50 | | |
| 5 | 48.748 | 5.00 | 25.4 | 1.80518 |
| 6 | 183.473 | (d6 = variable) | | |
| 7 | 52.816 | 1.20 | 25.4 | 1.80518 |
| 8 | 24.589 | 5.50 | 57.0 | 1.62280 |
| 9 | −68.445 | (d9 = variable) | | |
| 10 | 34.746 | 3.00 | 53.9 | 1.71300 |
| 11 | 83.441 | (d11 = variable) | | |
| 12 | −66.127 | 1.20 | 49.4 | 1.77279 |
| 13 | 30.846 | 4.00 | 25.4 | 1.80518 |
| 14 | −507.582 | 0.20 | | |
| 15 | 99.379 | 2.00 | 49.4 | 1.77279 |
| 16 | 42.197 | (d16 = variable) | | |
| 17 | 47.717 | 3.50 | 47.1 | 1.67003 |
| 18 | −64.166 | 0.50 | | |
| 19 | −372.898 | 2.00 | 33.9 | 1.80384 |
| 20 | 37.651 | 3.00 | | |
| 21 | −257.673 | 3.00 | 53.7 | 1.69350 |
| 22 | −54.059 | 0.20 | | |
| 23 | 63.044 | 7.50 | 58.5 | 1.61272 |
| 24 | −20.431 | 1.70 | 23.0 | 1.86074 |
| 25 | −48.705 | (BF = variable) | | |

(Variable distances for zooming)

| f | 20.5998 | 27.9997 | 33.9996 |
|---|---|---|---|
| $D_0$ | ∞ | ∞ | ∞ |
| d6 | 16.9829 | 5.7705 | 0.9513 |
| d9 | 3.0032 | 3.0032 | 3.0032 |
| d11 | 3.7664 | 8.7597 | 12.6401 |
| d16 | 9.8752 | 4.8819 | 1.0015 |
| Bf | 39.0047 | 45.2461 | 50.0964 |

(Aspherical coefficients of 2nd face)

-continued

| Conical constant: | k = 0.7000 |
| --- | --- |
| Aspherical constants: | C2 = 0.6879 × $10^{-2}$ |
| | C4 = 0.4017 × $10^{-5}$ |
| | C6 = 0.1607 × $10^{-8}$ |
| | C8 = 0.1675 × $10^{-10}$ |
| | C10 = 0.0000 |

$F_1/F_w = -1.359$      (1)

$F_{2F}/F_w = 2.913$      (2)

$F_{2R}/F_w = 3.952$      (3)

$F_3/F_w = -2.439$      (4)

$F_4/F_w = 1.942$      (5)

$D_1/F_w = 0.171$      (6)

$F_{1F}/F_w = 0.771$      (7)

wherein, the numbers at the left-hand side indicate the sequential order from the object side, r stands for the radius of curvature of lens face, d for the distance between lens faces, n for refractive index and $\nu$ for Abbe's number both for the d-line ($\lambda = 587.6$ nm), FN for F-number, $2\omega$ for image angle, $d_0$ for the distance from the object to the lens face closest thereto, Bf for the rear focal length; and the aspherical face is defined by:

$$X(h) = \frac{h^2/r}{1 + (1 - kh^2/r^2)^{\frac{1}{2}}} + \sum_{i=1}^{5} (C_{2i} \times h^{2i})$$

in which:
h: height from the optical axis;
X(h): axial distance to the tengential plane to the aspherical face at the height h from the optical axis;
r: radius of curvature at the optical axis;
k: conical constant;
$c_{2i}$: aspherical constant of 2i-th order; and
wherein:
$F_1$: focal length of the first lens group;
$F_{2F}$: focal length of the positive adhered lens in the second lens group;
$F_{2R}$: focal length of the positive single lens in the second lens group;
$F_3$: focal length of the third lens group;
$F_4$: focal length of the fourth lens group;
$D_1$: axial distance from the negative single lens to the positive lens closest to the image side in the first lens group; and
$F_{1F}$: synthesized focal length of the negative meniscus lens and the negative single lens in the first lens group.

* * * * *